Patented Aug. 1, 1944

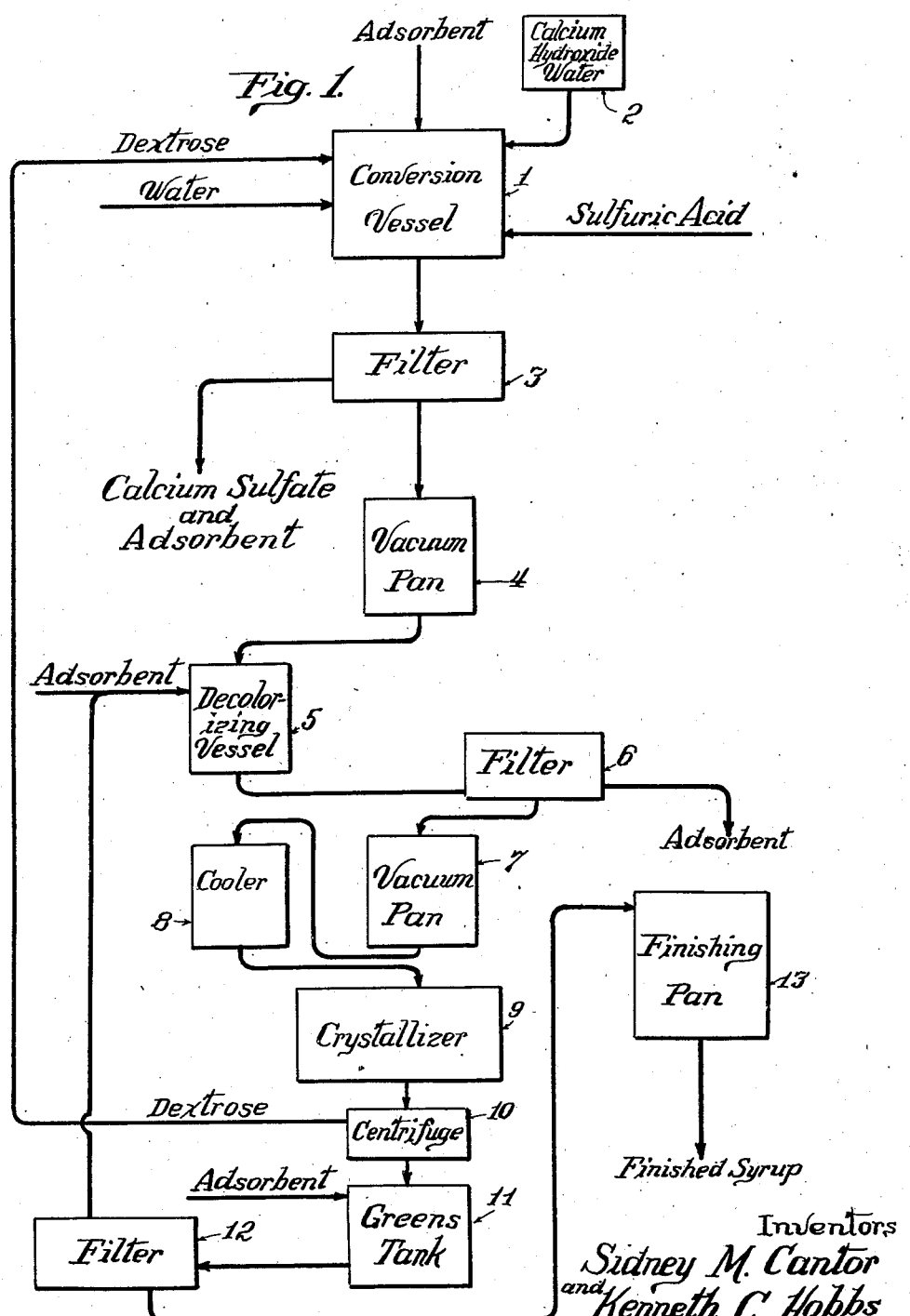

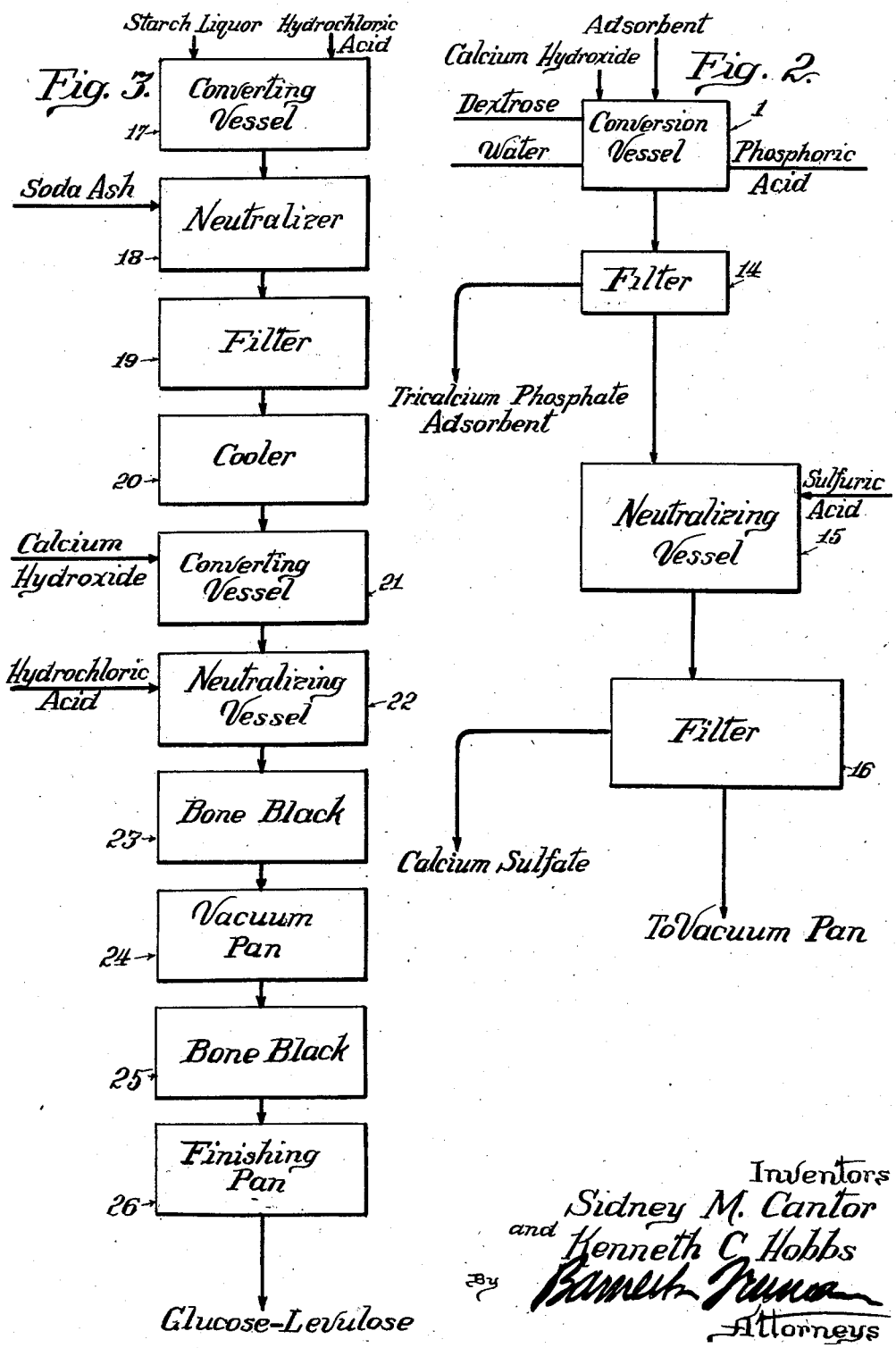

2,354,664

UNITED STATES PATENT OFFICE 2,354,664

CONVERSION OF DEXTROSE TO LEVULOSE

Sidney M. Cantor, Riverside, and Kenneth C. Hobbs, Berwyn, Ill., assignors to Corn Product Refining Company, New York, N. Y., a corporation of New Jersey Application August 3, 1940, Serial No. 350,820

10 Claims. (Cl. 127—36)

This invention relates to the conversion of dextrose into levulose; and the principal object of the invention is to provide a practical process for effecting such conversion.

The invention is applicable to water solutions of pure dextrose; to completely or partially converted liquors obtained by the acid hydrolysis of starch; to mother liquors derived from the process of making crystalline dextrose; to dextrose solutions obtained by enzymic conversion of starch or by the conversion partly by the use of acid and partly by the use of enzymes; to dextrose solutions obtained by the hydrolysis of cellulose; and, in fact, to any dextrose or dextrose containing solution of which it is desired to convert part of the dextrose to levulose. For example, the invention may be used with particular advantage in the treatment of a converted liquor having a high dextrose content produced by converting a starch suspension having a density of about 5° Baumé since the higher percentage of dextrose in the liquor treated the higher will be the percentage of levulose in the converted liquor. A 5° Baumé starch suspension when hydrolyzed will give a dextrose solution of close to 10° Brix.

A further object of the invention is to provide a process of converting dextrose to levulose whereby the production of non-levulose sugars and sugar substances, such as mannose, non-fermentable sugars most of which are of the group known as glutose, and saccharinic acids, is minimized. The presence of mannose in substantial quantities will give the syrup a bitter taste. The saccharinic acids impart a burned taste to the syrup. The non-fermentable sugars, usually referred to as glutose, have no nutritional value but, contrary to common opinion, are not harmful. They are somewhat sweet but less so than levulose. To the extent that they are present the amount of levulose is reduced so that the sweetness of the syrup is consequently diminished. The present invention, therefore, seeks to and has provided a process whereby these non-levulose conversion products are produced only in such small quantities as not to be objectionable. While obviously no definite limits can be fixed, it is ordinarily desirable that the mannose should not be present in quantity more than 1% of the dextrose treated dry substance basis; that the saccharinic acid content should not exceed about 2%; and that the unfermentable sugars should not exceed in quantity about 10%. Within these limitations a syrup can be obtained which in respect to taste and levulose content will be entirely acceptable.

A further object of the invention is to make it possible to produce a dextrose-levulose syrup by the conversion of dextrose, which in color, taste and other qualities will compare favorably with and be, in fact, in all respects a substitute for, invert sugar syrups now on the market. These invert sugar syrups are, at the present time, produced by the hydrolysis of sucrose. They ordinarily contain about 46%–48% dextrose, 43%–44% levulose, and some conversion products of sugar resulting mostly from the polymerization of some of the dextrose and levulose formed by the hydrolysis of the sucrose; but the composition of these syrups, it may be said, may differ considerably depending upon the purity of the sucrose solution used and upon differing conditions of hydrolysis. The invert sugar syrup substitute made in accordance with the present invention, as practiced preferably, will have a composition somewhat different from the invert syrups made from sucrose, but as to taste and color, the most important considerations, it will be found indistinguishable from the commercial product, generally speaking.

A further object of the invention is to provide a process for converting into levulose a part of the dextrose contained in the starch syrup commonly called "glucose," which consists of a mixture of dextrines, maltose and dextrose, and has a purity, i. e. percentage of reducing sugar calculated as dextrose of about 53%, or say between 42% and 62% dry substance basis. These syrups which may differ more or less in dextrose content and in other respects will be referred to herein as syrups "of the glucose type" or simply as "glucose," using this term in its commercial not chemical sense. The conversion of part of the dextrose in these syrups increases the sweetness of the syrup, without decreasing viscosity or body, making it unnecessary, for example, to add sucrose when the syrup is used as a table syrup. Furthermore, the conversion of part of the dextrose to levulose makes it possible to carry the hydrolyzation of the starch, in the glucose conversion, to a higher dextrose content, than has heretofore been possible, without incurring the risk of the dextrose subsequently crystallizing out of the syrup. It has been the practice in making glucose to convert to as high a dextrose content as possible and still keep the dextrose in solution. There have been demands for glucose syrups of higher dextrose content than this, and such syrups have been produced for certain purposes, but always with the risk that the dextrose will in part crystallize out of the solution. When the dextrose in a glucose syrup is converted in part to levulose the replacement of a certain amount of the dextrose with an equivalent amount of the levulose, the solubility of which is higher than dextrose, and the fact that the presence of levulose tends to inhibit dextrose crystallization, make it feasible to convert the starch to a much higher dextrose content than has been possible heretofore in the production of these syrups.

The glucose product in this case and also the invert syrup substitute referred to above are novel products.

In respect to sweetness the ratio as between levulose, sucrose and dextrose is in the neighborhood of 150–100–75.

The invention consists, essentially, first, in the conversion of the dextrose to levulose through the action of an alkaline catalyst and under controlled conditions whereby the production of non-levulose sugars and sugar substances in undesirable quantities is avoided; second, in the application of this procedure to the production of invert sugar syrups, or like products, in which case conversion is followed by the removal by crystallization of enough of the remaining dextrose to establish the proper ratio between dextrose and levulose; and third the application of the improved conversion procedure to the treatment of hydrolyzed starch syrups to give them novel characteristics as herein described.

As a catalyst it is possible to use any basic material, organic or inorganic, which does not destroy or break down the dextrose. For example, one may use the oxides or hydroxides of any of the alkaline earths, calcium, barium, and strontium, or the hydroxides of the alkali metals, sodium and potassium. Disodium phosphate could be used as a catalyst, and also organic bases such as pyridine, quinoline and soluble aliphatic amines. For reasons of economy and convenience the best catalyst is believed to be calcium hydroxide.

In the control of the conversion of dextrose to levulose in accordance with the present invention, and to carry out its purposes, the factors of density of the dextrose containing solution, the quantity of the catalyst, the temperature, and duration of the converting operation are important. These factors are, within limits, related variables and change in one factor can be compensated for, to some extent at least, by a change in another factor.

The aim, in controlling the process, is to limit and minimize the production of non-levulose sugars and sugar substances, viz. mannose, saccharinic acids, and non-fermentable sugars. For the production of an invert sugar syrup substitute from a solution of pure dextrose, where a single crystallization of the dextrose is contemplated, the dextrose solution subjected to the lime treatment should be at a density of about 10°–15° Brix. It is quite possible to obtain satisfactory results by converting at densities up to 50° Brix; but, in such case, the conversion must be stopped at a relatively low levulose content; and if the aim is a syrup which will match commercial invert sugar syrups; it will be necessary, ordinarily, to subject the dextrose-levulose solution to two or more crystallizations in order to remove enough of the dextrose to give the desired ratio of levulose to dextrose. If with the higher Brix solutions, the lime conversion is carried beyond a certain point, say 10%–14% levulose, the increase in levulose will thereafter be rather small and entirely disproportionate to the very undesirable increase in the non-levulose conversion products.

The alkaline catalyst should be used in amounts to give the solution a pH between 9.0 and 10.5. If higher pH's are used, there is risk of decomposing the dextrose. If small amounts are used, the operation will be slow and hence uneconomical. For glucose conversions the pH should not be greater than 10. Beyond this there is danger of the lime causing precipitation of the dextrines in the glucose. This pH is obtained by using 0.5% to 0.8% calcium oxide or the equivalent amount of calcium hydroxide based upon dry substance dextrose. This range cannot be exceeded to any considerable extent without bringing about the destruction of some of the dextrose.

The converting temperature must be relatively low, that is, below the temperature at which the sugar in the solution, in the presence of the alkaline catalyst, will be broken down. A suitable converting temperature is 45° C. (113° F.) and a possible range is 40°–60° C. (104°–140° F.). This reaction can be carried out at lower temperatures provided the time is proportionally prolonged.

With the temperatures as indicated, and with solution densities of 10° Brix, the preferred conversion time is about 7 hours, or within a range of 5 to 8 hours.

The solution is preferably kept in constant agitation during the converting operation.

Where the invention is used for the production of an invert sugar syrup substitute, the converted dextrose-levulose solution is, after reduction in pH to a point to stop the conversion, subjected to an operation for removing dextrose by crystallization. The crystallization of the dextrose is preferably carried out with slow agitation, that is, the method of crystallization in motion is employed. The operation is carried on in the presence of seed crystals which may be foots from a previous crystallizing operation.

The application of the invention to practice will be illustrated in specific examples to be given below. These examples should be considered as typical and informative only and not as limiting the conversion to the particular operating data given; the intention being to cover all equivalents and all modifications within the scope of the appended claims.

Unless otherwise specified, proportions of the different substances are given by weight on dry substance basis. Ranges are indicated in parentheses. These ranges are practical not critical unless so indicated.

The preferred processes as described in detail in the examples are illustrated diagrammatically in the accompanying drawings, wherein:

Fig. 1 is a flow sheet illustrating the process of Example 1.

Fig. 2 is a fragmentary flow sheet illustrating the modification described in Example 2; Figs. 1 and 2 illustrating processes suitable particularly for the production of an invert sugar syrup substitute; and Fig. 3 is a flow sheet illustrating the process of Example 3 in which glucose converted liquors are treated.

EXAMPLE 1—FIG. 1

The process consists, preferably, of the following steps:

(a) 100 pounds of pure dextrose hydrate is dissolved in vessel 1 with 850 pounds of water giving a 10° Brix solution. The density may be increased up to 15° Brix. Above this range of 10°–15° Brix the extent to which levulose conversion can be carried is limited by other reactions producing non-levulose conversion products. Below the indicated range the production of levulose is so reduced, in comparison with total sugar concentration, as to make the process uneconomical.

(b) 0.6 pound of calcium oxide (or 0.74 pound of calcium hydroxide) is suspended in 50 pounds of water in the mixing vessel 2 and the solution added slowly to the liquor in vessel 1. The amount of the catalyst may vary from 0.5 to 0.8 pound of calcium oxide or the equivalent amounts of calcium hydroxide. The liquor will have a pH of 10.2 which may vary from 9 to 10.5.

The amount of lime used should be carefully adjusted, in any case, because an excess will cause the dextrose and levulose to decompose into side break down products such as saccharinic acids and glyoxal. If insufficient lime is added, the conversion to levulose will be retarded, involving a longer period of conversion.

(c) Preferably an adsorption agent is added to the sugar liquor at this stage of the process. It has been found that a lighter converted liquor is obtained by introducing some of the adsorbent into the dextrose solution before the levulose conversion. For example, 1% of activated vegetable carbon (Darco) based upon the weight of the dry substance sugar is added to the liquor in vessel 1. The amount may vary between 0.5% and 1%. Any suitable adsorbent substance may be used.

(d) The liquor in vessel 1 is heated to a temperature of 45° C. (113° F.) for about 7 hours. A practical temperature range is 40°–60° C. (104°–140° F.); and the converting temperature may vary from 5 to 8 hours.

The liquor is kept in constant agitation during the conversion period.

(e) Sufficient 15° Baumé or 17% sulfuric acid is then introduced into the liquor in vessel 1 to neutralize the lime to calcium sulfate and thereby stop the converting operation. The amount of sulfuric acid will be between 0.6 and 0.7 gallon of 15° Baumé acid and the pH of the neutralized liquor will be about 4.1 (4.0–5.0). If the liquor is much above 5.0 pH, the lime conversion is likely to continue to a greater or less extent during the rest of the process. If the pH of the liquor is much below 4.0, there will be danger of dextrose polymers being formed during the refining process, that is, polysaccharides of the character found in acid converted starch liquors. The term "neutralize" is used in the sense of a pH change which will effectively arrest the alkaline reaction.

(f) The converted liquor is now filtered in filter 3 to remove the adsorbent and calcium sulfate. This will leave about 100 gallons of clear converted liquor, the analysis of which on dry substance basis will be about as follows:

| | |
|---|---|
| Dextrose Percent by weight | 70.3 |
| Levulose do | 25.4 |
| Mannose do | 0.53 |
| Non-fermentable sugars do | 3.8 |
| Saccharinic acids do | 0.5 |

(g) The filtrate from filter 3 is then concentrated in vacuum pan 4 to 25° Baumé (20°–27°) at a temperature not in excess of 60° C. (140 F.). The temperature must be kept down in order to prevent decomposition of the levulose which takes place at the higher temperatures.

(h) The filtered liquor from vacuum pan 4 is delivered to a vessel 5, and there is introduced into the liquor 1% of Darco (0.5%–1%), on the weight of dry substance sugar, and the liquor is agitated for about 30 minutes (10 to 30 minutes) to bring about decolorization. The adsorption agent may be used at any stage of the process.

(i) The decolorized liquor from tank 5 is filtered in filter 6 to remove the adsorbent.

(j) The liquor is then concentrated in vacuum pan 7 to a density of 40° Baumé (38°–40°) at a temperature below 60° C. (140° F.).

(k) The concentrated liquor from vacuum pan 7 is cooled in the cooler 8 to about 50° C. (120° F.).

(l) The liquor is then run into a crystallizer 9 provided, preferably, with a slow moving agitator, and allowed to crystallize for between 48 and 60 hours, during which time the temperature will drop to about 21° C. (70° F.). The liquor in the crystallizer may be seeded with foots from a previously crystallized batch or with dextrose crystals from any other source.

(m) The massecuite from crystallizer 9 is centrifuged at 10 to remove about 40 pounds of dextrose which is preferably returned to vessel 1; the 100 pounds of dextrose described above as introduced into vessel 1 including any dextrose returned from centrifugal 10.

(n) The mother liquor from centrifuge 10 is introduced into greens tank 11 together with 0.5% to 1% of fresh Darco which is allowed to remain in contact with the liquor for about 30 minutes (10–30 minutes) at a temperature below 60° C. (140° F.).

(o) The adsorbent is removed from the mother liquor by filter 12 and is preferably introduced into vessel 5 with enough fresh adsorbent to make up the required 0.5% to 1%.

(p) The liquor from filter 12 is concentrated in the finishing vacuum pan 13 to a density of 42° Baumé (40°–46°) with the temperature maintained in the vacuum pan below 60° C. (140° F.).

The concentrated liquor is a syrup product analyzing as follows, the composition of the liquor being capable of variation, however, within the ranges indicated:

| | Per cent | |
|---|---|---|
| Dextrose | 59.2 | (68.5–37) |
| Levulose | 31.1 | (30–50) |
| Mannose | 1.0 | (0.0–1.0) |
| Non-fermentable sugars | 6.5 | (1–10) |
| Saccharinic acids | 0.8 | (0.5–2.0) |

This product, while differing in composition from the ordinary invert sugar syrup made from sucrose, the non-fermentable sugar content being higher, is to all intents and purposes the equivalent of commercial invert sugar syrup. The somewhat lower levulose content is compensated for, so far as sweetness is concerned, by the increased amount of non-fermentable sugars (largely the mixture known as glutose) which have a sweet taste.

One of the advantages of the process of the present invention, in comparison with the process of inverting sucrose, is that the ratio of levulose to dextrose may be varied to any extent desired, whereas it is relatively constant in the case of sucrose inversion.

EXAMPLE 2—FIG. 2

Example 1 involves the removal of lime by the addition of sulfuric acid resulting in the precipitation of calcium sulfate. A more efficient method of removing the lime is by the use, successively, first of phosphoric acid and then of sulfuric acid. The superior efficiency of this expedient is based upon the fact that tricalcium phosphate, the salt formed by the neutralizing operation with phosphoric acid, is more insoluble at 7 pH than calcium sulfate at 4 pH. Referring to Fig. 2, sufficient phosphoric acid is added to conversion vessel 1 (in place of sulfuric acid) to bring the pH of the converted liquor to 7.0 (6.9–7.2). The neutralized liquor is then filtered at 14 to remove tricalcium phosphate and also the adsorbent, and the liquor is run into a vessel 15 into which is introduced sufficient 15° Baumé sulfuric acid to give a pH of 4 (4.0–5.0). The liquor is then filtered at 16 to remove precipitated calcium sulfate.

It will be possible to use sulfuric acid in two steps in place of using phosphoric acid and sulfuric acid successively; and this will result in the removal of more lime than is removed by a single step process, since calcium sulfate is more insoluble at 7 pH than at 4 pH; but not as much of the salt will be removed as when phosphoric acid is used in the first neutralizing step and the salt is consequently tricalcium phosphate.

It would also be possible to carry the liquor down to 4 pH in one operation and with phosphoric acid except for the cost involved in the use of this more expensive acid.

EXAMPLE 3—CONVERSION OF DEXTROSE IN GLUCOSE SYRUPS—FIG. 3

The process consists preferably of the following steps:

(a) 22° Baumé starch liquor is converted in vessel 17 with hydrochloric acid as a hydrolyzing agent to a purity (reducing sugar calculated as dextrose) of 53%, which may vary, however, from 42% to 62%.

(b) The converted liquor is neutralized at 18 with soda ash to a pH of 5.0.

These steps (except as to the higher purity) are in accordance with common glucose practice.

(c) The neutralized liquor is filtered at 19.

(d) The filtrate is cooled to 56° C. (132° F.), which may be varied between 60° and 52° C. (140°–125° F.), in the cooler 20.

(e) The cooled liquor from 20 is run into the converting vessel 21 at 22°–24° Baumé with 0.1% calcium hydroxide on dry substance weight basis (0.1%–0.2%); or a sufficient amount to give the liquor a pH of 9.6 (9.0–10.0). The liquor is converted for 6 hours (5–7 hours) at about 56° C. (132° F.).

(f) The converted liquor is neutralized, in the neutralizing vessel 22, with hydrochloric acid to a pH of 4.5 (4.1–4.8). Hydrochloric acid is used, preferably, instead of sulfuric acid because the use of sulfuric acid would involve traces of calcium sulfate tending to give the product a hazy appearance.

(g) The neutralized converted liquor is subjected to the usual refining operations: i. e. through bone black at 23, concentration to 30° Baumé at 24, through bone black at 25, and concentration to 42° Baumé in the finishing pans 26.

The levulose containing glucose syrup made according to the above process will be found to have the following analysis: dextrine 41%; maltose 18%; dextrose 34% (36%–30%); levulose 6% (4%–10%); other sugars (non-levulose conversion products such as mannose, etc.) 1%; while the ordinary 53% purity glucose will contain: dextrine 41%; maltose 19%; and dextrose 40%. It will be understood that in syrups of this type the percentage of dextrines may vary and with it the percentages of the other ingredients.

Among the advantages of this new product are the following: The glucose or starch syrup has increased sweetness without decreasing the body or viscosity which is provided for by the dextrines in the product. In the commercial syrup mixing trade glucose is mixed with sucrose in order to obtain the proper degree of sweetness. With the new product it is possible to obtain satisfactory sweetness without the incorporation of any sucrose.

Certain candy manufacturers like a high purity glucose. The ordinary glucose has a purity of about 43%, while the demand is for a purity as high as 55%. At this purity crystallization of the dextrose often takes place. With the new product it is possible to obtain a purity of 55% or higher, without subsequent crystallization of the dextrose, due to the replacement of some of the dextrose by levulose, the solubility of which is higher than that of dextrose, and to the fact that the levulose acts as an inhibitor of dextrose crystallization.

EXAMPLE 4—DOUBLE CRYSTALLIZATION OF DEXTROSE

The following is the report of a rather small scale operation involving treatment of a high density dextrose solution with two crystallizations of the dextrose-levulose solution for removal of dextrose: 200 pounds of a 50% dextrose solution (50° Brix) was heated to 45° C. (113° F.) and 0.6 pound of calcium oxide suspended in 4 quarts of water was gradually added to the dextrose solution with constant agitation. The conversion was carried on at 45° C. (113° F.). The liquor was then neutralized by the slow gradual addition of 6 normal sulfuric acid until the liquor had a pH of 4.0. The converted liquor was decolorized with 1% Darco which was allowed to remain in contact with the liquor at 55° C. (132° F.) for 45 minutes. The liquor was then filtered to remove calcium sulfate and the adsorbent.

The liquor had the following composition by weight, dry substance basis:

| | Per cent |
|---|---|
| Dextrose | 85.4 |
| Levulose | 11.6 |
| Mannose | 0.1 |
| Non-fermentable sugars | 2.3 |
| Saccharinic acids | 0.5 |

The decolored dextrose-levulose liquor was concentrated in a vacuum pan to 38° Baumé, seeded with dextrose crystals and crystallized in motion for twenty-four hours, the temperature of the massecuite reaching about room temperature. The massecuite was then centrifuged to remove the crystallized dextrose and the liquor concentrated to 43° Baumé, seeded with dextrose crystals and recrystallized for twenty-four hours, with temperature drop down to room temperature, the second massecuite centrifuged to remove crystalline dextrose and the liquor decolorized by two adsorption treatments using in each case one per cent of Darco.

The final product had the following composition on analysis:

| | Per cent |
|---|---|
| Dextrose | 47.7 |
| Levulose | 39.8 |
| Mannose | 1.0 |
| Non-fermentable sugars | 8.5 |
| Saccharinic acids | 2.0 |

This syrup was in color, taste and in all other respects equal to commercial invert sugar.

To illustrate the necessity of control of the process in respect to time and density factors, the following table is subjoined, reporting conversion of a 50° Brix dextrose solution from 1 to 40.5 hours, the amount of lime and the temperature being those given in Example 1. The solutions treated were pure water solutions of dextrose.

*50° Brix dextrose solution—0.75% lime—45° C.*

| Hours | Aldose | Mannose | Dextrose | Ketose | Non-fermentable sugars | Saccharinic acids | Levulose |
|---|---|---|---|---|---|---|---|
| 0 | 100.00 | 0 | 100.00 | 0 | 0 | 0 | 0 |
| 1 | 96.50 | 0 | 96.50 | 3.50 | 0.10 | 0.13 | 3.3 |
| 6 | 85.72 | 0.1 | 85.62 | 14.4 | 2.30 | 0.58 | 11.5 |
| 6.8 | 82.04 | 0.2 | 81.84 | 17.96 | 4.35 | 0.65 | 13.0 |
| 10 | 76.60 | 0.42 | 76.19 | 23.40 | 6.25 | 0.95 | 16.2 |
| 17 | 70.24 | 1.61 | 68.63 | 29.76 | 12.10 | 1.29 | 16.4 |
| 40.5 | 60.72 | 2.75 | 57.97 | 39.28 | 20.76 | 2.65 | 15.9 |

In the above table, the aldoses referred to are dextrose and mannose and the ketoses are levulose, non-fermentable sugars and saccharinic acids.

It will be seen from the table that with a 50% dextrose solution conversion for six or seven hours gives relatively low contents of non-levulose conversion products and levulose contents which are not very high but are practical (in the production of an invert sugar syrup substitute, for example) provided the dextrose-levulose solution is given two crystallizations. However, if the conversion is carried much beyond 6–7 hours, the increase in levulose is not at all proportionate to the increased time of conversion while the contents of mannose, non-fermentable sugars and saccharinic acids increase sharply.

In order to obtain a relatively high levulose content, relative that is to dextrose, without twice crystallizing the dextrose, and without producing undesirable amounts of the non-levulose conversion products, it is necessary to use low density dextrose solutions such as are indicated in Example 1. Higher densities could be employed with higher temperatures or prolonged conversions, but such operations would involve risk of decomposition of the dextrose, in the case of higher temperatures, or, in the case of longer conversions, greater cost of manufacture when the process is carried out on a commercial scale.

The foregoing specification has in view specifically, first, production of a dextrose-levulose syrup which, in all practical respects will match commercial invert sugar despite its somewhat different composition (the larger amount of non-fermentable sugars particularly); and second, the treatment of syrups of the glucose-syrup type to increase their sweetness and make possible higher dextrose content without risk of crystallization of the dextrose. Operating data have been given suitable for practicing the above two processes in ways which will be most economical and convenient. However, the invention is not to be regarded as limited to these particular processes. For example, syrups may be made (and this is one of the advantages of the invention) in which the ratio of levulose to dextrose may be varied to any extent desired so that a variety of products differing in sweetness and in solubility characteristics from the invert sugar made by hydrolyzing sucrose may be produced to meet varying demands. For products in which larger quantities of non-levulose conversion products are unobjectionable, the close control of the process may, obviously, be considerably relaxed. The dextrose-levulose syrups of the present invention may advantageously be used for the production of crystalline levulose by any suitable process such for example as that disclosed in the United States patent to Jackson No. 2,007,971.

We claim:

1. Process for the production of a levulose containing syrup which comprises: mixing with a dextrose containing solution of a density of 10°–15° Brix an adsorption agent and a sufficient amount of an alkaline catalyst to give the solution a pH of 9.0–10.5; heating the solution, with agitation, at a temperature of 104°–140° F. for 5–8 hours; neutralizing the converted liquor to a pH of 4.0–5.0; filtering the neutralized liquor to remove precipitated and suspended solids; concentrating the liquor to a density of 20°–27° Baumé at a temperature not in excess of 140° F.; treating the liquor with an adsorption agent and filtering the liquor; concentrating the filtered liquor to a density of 38°–41° Baumé at a temperature not in excess of 140° F.; cooling the liquor; crystallizing the same in motion for the production of solid dextrose; and removing the solid dextrose from the solution.

2. Process for the production of a dextrose-levulose syrup which comprises: heating a dextrose containing solution at a temperature of 104°–140° F. for 5–8 hours, in the presence of an amount of alkaline catalyst to give the solution a pH of 9.0–10.5 to convert a substantial portion of the dextrose to levulose; and neutralizing the converted liquor to arrest the converting operation.

3. Process for the production of a dextrose-levulose syrup which comprises: heating a substantially pure solution of dextrose having a density of 10°–50° Brix at a temperature of 104°–140° F. for 5–8 hours, in the presence of an amount of alkaline catalyst to give the solution a pH of 9.0–10.5 to convert a substantial portion of dextrose to levulose; and neutralizing the converted liquor to arrest the converting operation.

4. Process for treating a hydrolyzed starch solution having a purity (reducing sugar calculated as dextrose) of approximately 42%–62% which comprises: heating said solution at a temperature of about 104°–140° F., in the presence of an alkaline catalyst to give the solution a pH of about 9.0–10. for about 5–7 hours to convert a part of the dextrose to levulose.

5. Process for treating a hydrolyzed starch solution having a purity (reducing sugar calculated as dextrose) of about 53% which comprises: heating said solution at a temperature of about 132° F. in the presence of an alkaline catalyst to give the solution a pH of about 9.6 for about 6 hours to convert a part of the dextrose to levulose.

6. The process according to claim 2 in which the alkaline catalyst consists essentially of a compound of calcium selected from the group consisting of calcium oxide and calcium hydroxide, and is removed by neutralizing the converted liquor first with phosphoric acid to a pH of about 7 and then with sulfuric acid to a pH of about 4, each neutralizing step being followed by a separating operation as between the liquor and the calcium salt formed by addition of acid in each instance.

7. The process according to claim 3 in which the alkaline catalyst consists essentially of a compound of calcium selected from the group consisting of calcium oxide and calcium hydroxide, and is removed by neutralizing the converted liquor first with phosphoric acid to a pH of about 7 and then with sulfuric acid to a pH of about 4, each neutralizing step being followed by a separating operation as between the liquor and the calcium salt formed by addition of acid in each instance.

8. The process according to claim 4 in which the alkaline catalyst consists essentially of a compound selected from the group consisting of calcium oxide and calcium hydroxide, and in which the converting operation is arrested by first neutralizing the liquor to a pH of about 7 with phosphoric acid and then to a pH of about 4 with sulfuric acid, each neutralizing step being followed by a separating operation as between the liquor and the calcium salt formed by addition of acid in each instance.

9. The process for the production of levulose-containing syrup which comprises: mixing with a dextrose-containing solution of a density of about 10° to 50° Brix an adsorption agent and a sufficient amount of an alkaline catalyst to give the solution a pH of about 9.0 to 10.5, heating the solution at a temperature of about 104° to 140° F. for about 5–8 hours, neutralizing the converted liquor to a pH of about 4.0 to 5.0 and removing solids including said adsorbent from the liquor.

10. Process for the production of a dextrose-levulose syrup which comprises heating a dextrose-containing solution at a temperature of about 104°–140° F. for about 5–8 hours in the presence of an amount of alkaline catalyst to give the solution a pH of about 9.0–10.5 to convert a substantial portion of the dextrose to levulose, and arresting the converting operation by adjusting the pH of the solution to about 4.0–5.0.

SIDNEY M. CANTOR.
KENNETH C. HOBBS.